April 13, 1954    A. E. CRANSTON, JR    2,674,959
SLICING MACHINE
Filed May 5, 1950    3 Sheets-Sheet 1
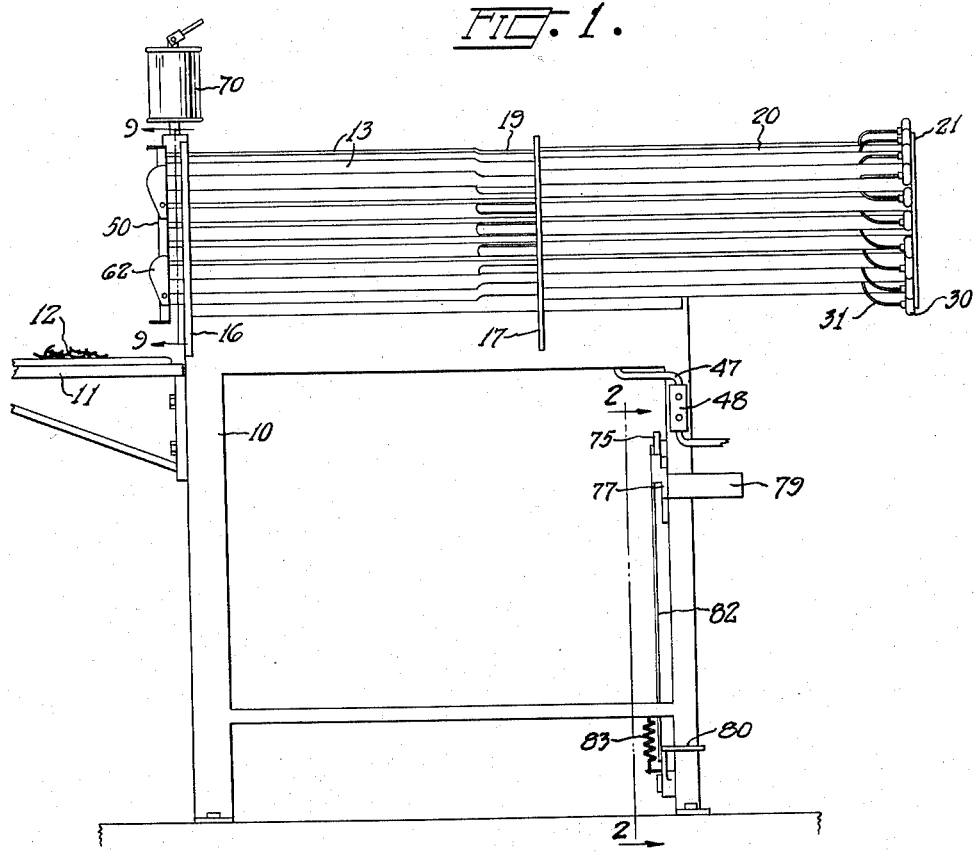
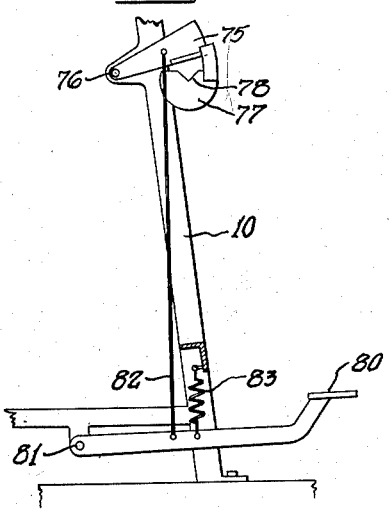
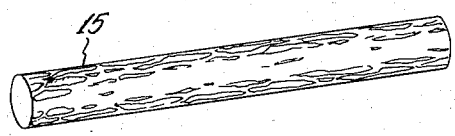
INVENTOR
ALBERT E. CRANSTON, JR.
BY
Cook and Schermerhorn
ATTORNEYS

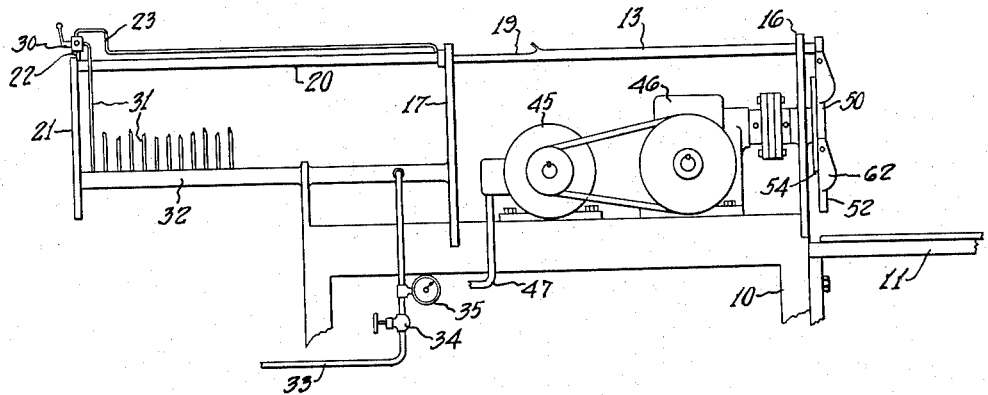
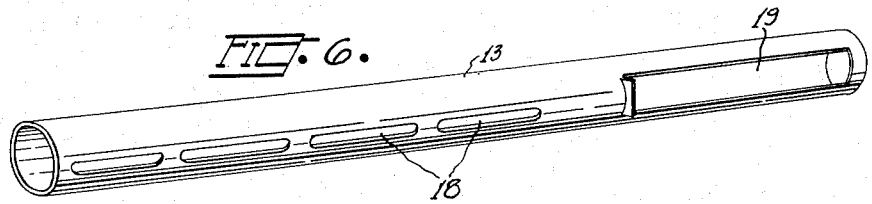
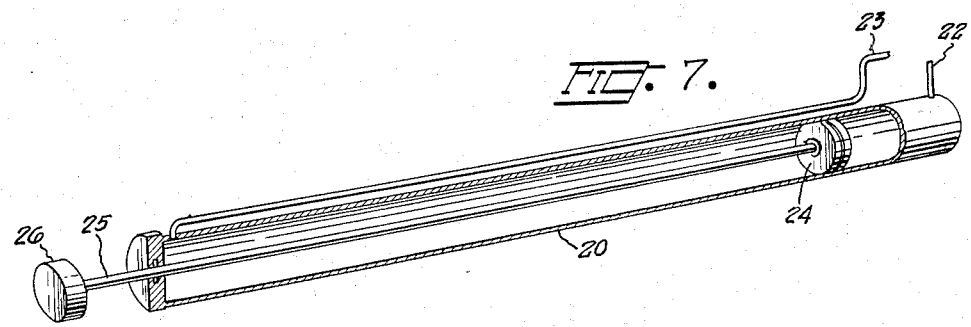
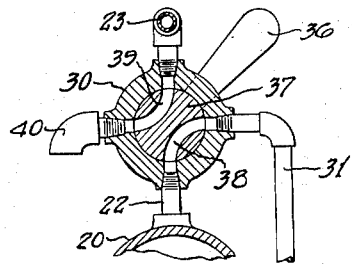
INVENTOR
ALBERT E. CRANSTON, JR.

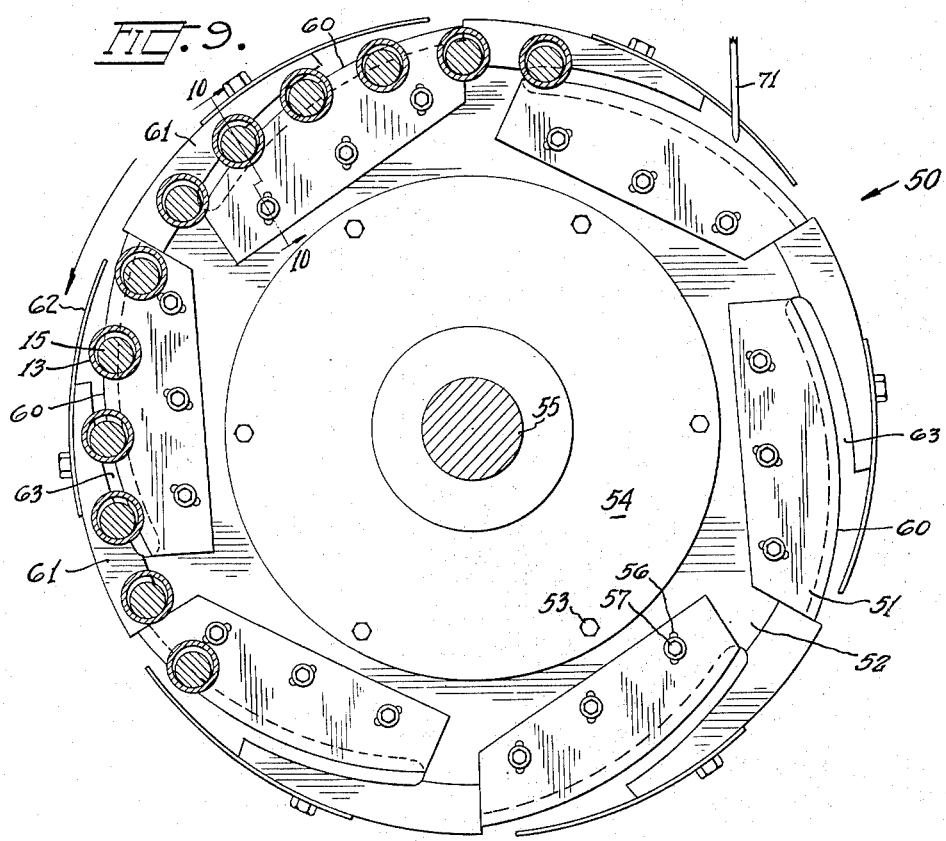
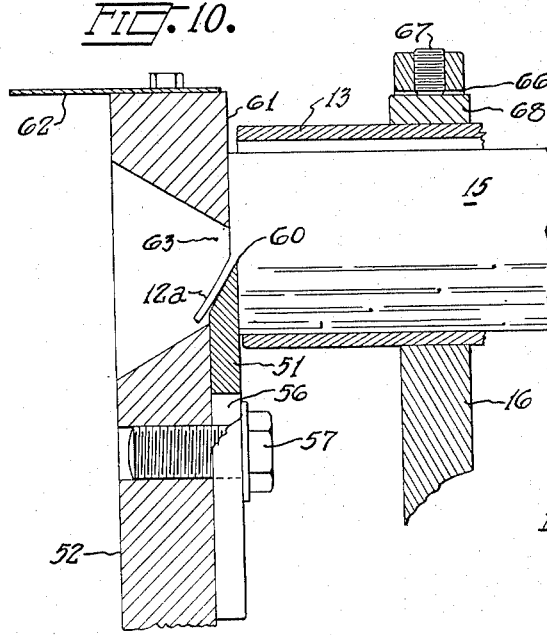
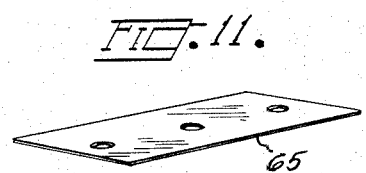
INVENTOR
ALBERT E. CRANSTON, JR.

Patented Apr. 13, 1954

2,674,959

UNITED STATES PATENT OFFICE 2,674,959

SLICING MACHINE

Albert E. Cranston, Jr., Milwaukie, Oreg.

Application May 5, 1950, Serial No. 160,375

12 Claims. (Cl. 107—21)

This invention relates to a machine for slicing pre-formed edible material in large quantity.

In the manufacture of certain crisp wafers or so-called chips, a prepared glutinized material is formed into long cylindrical loaves which are then sliced into thin pieces in preparation for a cooking process. Conventional meat slicing machines and the like cannot handle material of this nature, and they are also incapable of making a large quantity of small slices quickly.

Objects of the present invention are, therefore, to provide a novel and improved slicing machine for cutting thin slices from such pre-formed, prepared material, to provide a machine which will slice a large amount of the material very quickly, to provide means for feeding the material through the machine continuously and without waste, and to provide a novel form of rotary cutter.

In general, the present machine comprises a magazine of cylindrical tubes equipped with compressed air means for feeding long, cylindrical loaves of the glutinized material into a rotary cutter. Provision is made for recharging the tubes of the magazine without stopping the machine, so that it may be kept in continuous operation until a desired quantity of the material has been sliced. Each revolution of the cutter produces a number of slices of accurately controlled thickness from each loaf of material in the magazine.

Other objects and advantages reside in the construction and arrangement of parts of the machine, and the invention will be better understood with reference to the preferred embodiment illustrated in the accompanying drawings and described in the following specification. It is to be understood, however, that the drawings are for the purpose of illustrating the invention, and are not intended to limit the invention, as various changes and modifications will occur to persons skilled in the art, and certain features may be used without others.

In the drawings:

Figure 1 is a side elevation view of a slicing machine embodying the principles of the invention;

Figure 2 is a view of an auxiliary cutting device taken on the line 2—2 of Figure 1;

Figure 3 is a perspective view of a pre-formed cylinder of the prepared material which is to be sliced for cooking;

Figure 4 is a perspective view of a freshly cut slice of the prepared material;

Figure 5 is a fragmentary elevation view of the machine taken on the opposite side from Figure 1 and showing only one of the plurality of magazine tubes which appear in Figure 1;

Figure 6 is a perspective view of one of the magazine tubes for the prepared material;

Figure 7 is a perspective view in section of an air cylinder and piston for feeding the prepared material through a magazine tube;

Figure 8 is a sectional view of one of the air control valves;

Figure 9 is a view of the rotary cutter taken on the line 9—9 of Figure 1;

Figure 10 is a sectional view taken on the line 10—10 of Figure 9; and

Figure 11 is a perspective view of a shim for a cutter blade.

Referring first to Figure 1, the operating mechanism of the machine is mounted on and carried by a base frame 10 having a horizontal shelf 11 for a tray to receive the slices 12 from a rotary cutter 50. Mounted on the frame 10 immediately behind the cutter 50 is a magazine comprising a series of feed tubes 13. Each tube 13 is adapted to receive a slender cylindrical loaf of the prepared material 15 illustrated in Figure 3. The slices 12 are cut as flat, circular discs from one end of each loaf 15, as shown in Figure 4, but they have a tendency to curl out of their originally flat condition.

The front ends of the tubes 13 are mounted in a circular supporting plate 16, and the rear ends are carried by a supporting plate 17. Each tube is apertured with a series of sight openings 18 and a filler opening 19, as shown in Figure 6. Mounted in alignment with each tube 13 is an air cylinder 20 having its front end carried by the plate 17 and its rear end carried by another supporting plate 21. Each of these cylinders has connections to air pipes 22 and 23 at its opposite ends, and is equipped with a piston 24 connected with a piston rod 25 and pusher plate 26, as shown in Figure 7.

The magazine tube 13 and air cylinder 20 are viewed in Figures 6 and 7 from the same side of the machine seen in Figure 1. Pusher plate 26 is adapted to extend into the tube 13 substantially to its front end, but may be retracted to clear the feed opening 19 by admitting compressed air to the pipe 23 to move the piston 24 to the right. A slender cylindrical loaf 15 of the prepared material, being somewhat flexible, may then be inserted in the feed opening 19, or as many of such loaves as may be accommodated by the length of the tube 13. Then, when pipe 23 is vented to atmosphere and pipe 22 is connected with a compressed air supply, the piston 24 and pusher plate 26 will be moved to the left to feed the material 15 forward in the tube 13 toward the cutter 50.

Referring now to Figure 5 wherein the machine is viewed from the side opposite that seen in Figure 1, and with all of the magazine tubes 13 and air cylinders 20 removed except one, it will be seen that the air pipes 22 and 23 are supplied through a valve 30 from one of a series of pipes 31 leading from a manifold 32. Manifold 32 is in turn supplied with air pressure from a pipe 33 equipped with a valve 34 and pressure gauge 35.

There is a valve 30 for each air cylinder 20, the valve construction being shown in Figure 6. Handle 36 is connected with the protruding end of a rotatable plug 37 having a pair of curved pages 38 and 39 to reverse the air connections for the opposite end of cylinder with respect to the supply pipe 31 and an exhaust vent 40. With the plug 37 in the position illustrated, the pressure pipe 31 is connected through passage 38 to the pipe 22 to feed the material 15 forward for slicing, the other end of cylinder 20 being vented to atmosphere through pipe 23 and passage 39. When the plug 37 is rotated a quarter turn in a counterclockwise direction, the passage 38 will connect the pressure pipe 31 with pipe 23, and the passage 39 will connect the vent 40 with pipe 22, to retract the pusher plate 26 to clear the filler opening 19 for refilling the particular magazine tube 13 associated with the valve which is operated.

Also shown in Figure 5 are a motor 45 and variable speed drive 46 for the cutter 50. The motor is energized by electric current supplied thereto by a conductor cord 47 which is connected to a suitable source of current through a push button switch 48 shown in Figure 1.

The construction of the cutter 50 and its relation to the prepared material in the feed tubes 13 is best shown in Figures 9 and 10. The cutter comprises a series of knife blades 51 mounted on an annular plate 52. Plate 52 is secured by bolts 53 to a circular plate 54 on a shaft 55 which is driven by the variable speed drive 46. Each blade 51 has a series of diagonal slots 56 to receive bolts or cap screws 57. The slots 56 allow for outward adjustment on the plate 52 as the blades are worn back by repeated sharpening.

The cutting edges 60 of the blades 51 are spirally disposed in a common cutting plane to slice outwardly away from the center of rotation. Adjacent the cutting edge of each blade is a spiral sector stop surface 61 on plate 52 against which the material 15 is pressed by pusher plates 26. The surfaces 61 lie in a common plane at a distance from the plane of cutting edges 60 equal to the thickness of the slices to be cut. Surfaces 61 are spaced from cutting edges 60 by spiral slots 63.

As the cutter revolves in the direction of the arrow in Figure 9, stop surfaces 61 slide across the ends of the material 15, with the knife edges 60 closely following, both knives and stop surfaces moving radially outwardly relative to the piece of material 15 which is being cut by reason of the spiral shape of the parts. As the knife edge cuts outwardly into the material 15, the surface 61 retreats ahead of the knife edge, until finally the surface 61 has passed out of contact with the material 15 and the material then presses solely against the surface of the revolving knife blade. At this instant, the partially cut slice 12a in Figure 10 is severed from the body of the material 15 and flies out against the small shield 62. There is a shield 62 for each knife blade to deflect the slices down toward the shelf 11 shown in Figure 1.

After severance of the slice, the loaf of material 15 continues to bear against the blade 51 until the blade has rotated past the end of the particular tube 13. Then the material 15 moves forward until it abuts the next stop surface 61 in advance of the next knife blade. Each stop surface 61 begins at the end of one blade and tapers to a terminus at a point intermediate the length of the following blade. Thus the feeding of the material is automatic under the action of the compressed air operated pusher plates 26, and the arcuate stop surfaces 61 limit the feed movement of each loaf of material after each slice is cut. Each knife blade 51 on the cutter cuts one slice from the material in each feed tube 13 in each revolution of the cutter. In the illustrated embodiment, there are twelve feed tubes in the magazine and six knife blades, whereby seventy-two slices are cut in each revolution of the cutter but, obviously, other arrangements may be used.

The thickness of the slices may be varied by adjusting the spacing of stop surfaces 61 from the cutting plane. This is conveniently accomplished by using thicker or thinner knife blades 51, or by inserting or removing shims 65 from between the blades 51 and plate 52. The cutter speed is adjusted by means of variable speed drive 46 to obtain best results with a particular composition of material 15.

For convenience in removal for cleaning, the front ends of feed tubes 13 are mounted in holes 66 in the plate 16 and secured by set screws 67. Small arcuate shoes 68 distribute the pressure of the set screw and prevent collapsing of the tubes.

The numeral 70 in Figure 1 designates a sight feed oiler for the cutter. This oiler has a dropper tube 71 disposed as shown in Figure 9 in communication with the path of knives 51 to drop mineral or vegetable oil on the rotating knives and stop surfaces 61 to lubricate the surfaces and prevent the food material from sticking thereto.

Figure 2 shows a manually operated clipper mounted on one of the legs of the frame 10 to cut off any dried ends of the cylindrical loaves before the loaves are inserted in the slicing machine. The cutting blade 75 is pivotally mounted at 76 for vertical movement relative to a stationary blade 77. The shearing edge of the blade 77 has a V-shaped notch 78 aligned with a short trough or rest 79 for one end of the loaf, as shown in Figure 1. The cutter is operated by a foot pedal 80 pivotally mounted at 81 on the frame 10. A link 82 connects the pedal 80 with the movable cutter blade 75, and spring 83 holds both of these members normally in raised positions, as shown. By means of this cutter, the ends of the loaves 15, if irregular or dried by exposure to the atmosphere, may be cut off square before the material is inserted in the magazine tubes 13, so that the first slices cut from each loaf by the rotary knives will be fresh and of full size.

The present machine slices all of the material of the loaves 15 without waste, the amount of material removed by end clipper 75 being negligible. One loaf is inserted behind another in each tube 13, and the slicing operation may proceed continuously as long as there is material remaining in these tubes to be sliced. The tubes 13 are filled, one at a time, while the machine is in operation, by manipulating the proper valve handle 36 to retract the pusher plate 26 in the tube to be filled. The material 15 is not gripped by a holding device, and so there are no end pieces left which will not feed through the slicing knives and no time lost in removing such end pieces and substituting new rolls of the edible material. Also, the present form of construction and arrangement is found to work satisfactorily with certain prepared food compositions which tend to stick on the parts and interfere with the operation of conventional slicing machines.

Having now described my invention and in what manner the same may be used, what I claim as new and desire to protect by Letters Patent is:

1. A slicing machine comprising a plurality of tubes for holding material to be sliced, a rotary cutter mounted adjacent one end of said tubes, feed openings in the sides of said tubes for insertion of said material, pusher elements in said tubes to feed said material toward said cutter, and means to retract said pusher elements one at a time past said feed openings for reloading said tubes while the machine is in operation.

2. In a slicing machine, a series of tubes for holding material to be sliced, a rotary cutter mounted at one end of said tubes, feed openings in the sides of said tubes for insertion of said material, a cylinder and piston assembly aligned with each of said tubes, and pusher elements connected with said pistons for longitudinal movement in said tubes past said feed openings to feed said material toward said rotary cutter.

3. In a slicing machine, a series of feed tubes for holding material to be sliced, a rotary cutter mounted adjacent one end of said tubes, elongated feed openings in the sides of said tubes at the other ends thereof for insertion of said material, cylinder and piston assemblies aligned with said tubes, individual pusher elements connected with said pistons for travel in said tubes past said feed openings to feed the material toward said cutter, a fluid pressure supply, pipes connected with opposite ends of said cylinders, and a valve on each cylinder to admit fluid pressure selectively to opposite ends of the cylinder for feeding or retracting the pusher element connected with the piston in said cylinder.

4. In a slicing machine, a plurality of feed tubes for holding material to be sliced, a rotary cutter mounted adjacent one end of said feed tubes, a series of knives on said cutter having spiral cutting edges, spiral stop surfaces on said cutter spaced radially outwardly from said knives to gauge the thickness of the slices cut by said knives, and shields mounted on the periphery of the cutter radially opposite said knives to prevent centrifugal scattering of the cut slices.

5. In a slicing machine, a plurality of feed tubes for holding material to be sliced, a rotary cutter mounted adjacent one end of said feed tubes, a plurality of circumferentially spaced flat knives mounted in a common plane on said cutter to present flat stop surfaces against said material, and stop surfaces on said cutter extending between said knives in a plane spaced from the plane of the cutting edges of said knives to determine the thickness of the slices.

6. In a slicing machine, a plurality of feed tubes for holding material to be sliced, a rotary cutter mounted adjacent one end of said tubes, a series of knives having spirally disposed cutting edges mounted in a common plane on said cutter, and a plurality of stop surfaces on said cutter disposed in a plane spaced from the plane of said cutting edges a distance equal to the thickness of slices to be cut, said stop surfaces being spirally arranged in radially spaced relation to said cutting edges to engage uncut portions of material projecting from said tubes as the cutter revolves.

7. A cutter for a slicing machine comprising a plate mounted on a shaft for rotation, a series of knives having spiral cutting edges mounted in a common plane on said plate, and spirally disposed stop surfaces on said plate adjacent said cutting edges and spaced from the plane of said cutting edges a distance equal to the thickness of the slices to be cut.

8. In a slicing machine, a plate mounted on a shaft for rotation, a series of blades mounted for radial adjustment on said plate, spiral cutting edges on said blades disposed in a common plane, stop surfaces on said plate adjacent the cutting edges of said blades in a common plane, and shims for insertion between said blades and said plate to adjust the position of the plane of said cutting edges relative to the plane of said stop surfaces to vary the thickness of the slices cut by the machine.

9. In a slicing machine for prepared glutinized material, a magazine having a series of tubes for holding loaves of the material to be sliced, a rotary cutter mounted adjacent one end of said magazine, fluid pressure operated means for feeding the loaves in said tubes toward said cutter, a series of circumferentially spaced knives mounted on said cutter having spiral cutting edges and flat top surfaces disposed in a common plane, and stop surfaces on said cutter immediately behind said knives relative to the direction of rotation of the cutter, said last mentioned stop surfaces being disposed in a common plane parallel with and spaced from the plane of said cutting edges to hold loaves projecting from said tubes in position for cutting slices of predetermined thickness.

10. In a slicing machine for loaves of soft plastic material, a magazine having a plurality of parallel tubes disposed in circular arrangement for holding said loaves, a rotary cutter mounted adjacent one end of the magazine for rotation on an axis concentric with said circular arrangement of tubes, a series of circumferentially spaced knives on said cutter having cutting edges disposed in a cutting plane extending transversely of the said tubes and having flat stop surfaces disposed in said cutting plane, each knife stop surface having sufficient area and being disposed to cover the end of a tube and support substantially the entire freshly cut surface of the material in the tube momentarily at the completion of each slicing operation, and stop surfaces on said cutter disposed in a parallel plane spaced axially from the cutting plane, there being one of said last mentioned stop surfaces following each knife relative to the direction of rotation and disposed to register with said tubes to support said material in position for engagement by the next knife whereby the slice thickness is determined by the axial spacing of said two planes.

11. In a slicing machine for loaves of soft plastic material, a magazine having a plurality of parallel tubes disposed in circular arrangement for holding said loaves, a rotary cutter mounted adjacent one end of said magazine for rotation on an axis concentric with said circular arrangement of tubes, a series of circumferentially spaced knives on said cutter having spiral cutting edges disposed in a cutting plane extending transversely of the said tubes and having flat stop surfaces disposed in said cutting plane, each knife stop surface having sufficient area and being disposed to cover the end of a tube and support substantially the entire freshly cut surface of the material in the tube momentarily at the completion of each slicing operation, and stop surfaces on said cutter disposed in a parallel plane spaced axially from said cutting plane, there being one of said last mentioned stop surfaces following each knife relative to the direction of rotation and having a portion spaced radially outwardly from the next knife on the cutter to register with said tubes for supporting said material in the interval between knives and for supporting the diminishing uncut portion of said material as the material is engaged by the spiral cutting edge of the next knife.

12. In a slicing machine for loaves of soft plastic material, a magazine having a plurality of parallel tubes disposed in circular arrangement for holding said loaves, a rotary cutter plate mounted adjacent one end of said magazine for rotation on an axis concentric with said circular arrangement of tubes, a series of circumferentially spaced knives on said cutter plate having spiral cutting edges disposed in a cutting plane extending transversely of the said tubes and having flat stop surfaces disposed in said cutting plane to engage and support the material in said tube during a slicing operation, and spiral stop surfaces on said cutter plate extending between said knives and along portions of the cutting edges thereof in radially spaced relation to said cutting edges and in axially spaced relation to said cutting plane to furnish the entire support for said material in the intervals between said knives and to support said material jointly with the knives as the material is being sliced, said plate having slotted spiral openings between said cutting edges of the knives and said spiral stop surfaces to pass cut slices of said material through said plate.

References Cited in the file of this patent

UNITED STATES PATENTS

| Number | Name | Date |
|---|---|---|
| 583,002 | Satterwhite | May 18, 1897 |
| 1,296,647 | Gillar et al. | Mar. 11, 1919 |
| 1,613,839 | Lowe | Jan. 11, 1927 |
| 1,768,580 | Dischert | July 1, 1930 |
| 1,883,829 | Skoverski | Oct. 18, 1932 |
| 1,913,291 | Rountree et al. | June 6, 1933 |
| 2,328,712 | Domke | Sept. 7, 1943 |
| 2,481,775 | Offenhauser | Sept. 13, 1949 |
| 2,530,880 | Hermann | Nov. 21, 1950 |
| 2,557,308 | Nippert | June 19, 1951 |

FOREIGN PATENTS

| Number | Country | Date |
|---|---|---|
| 513,640 | Germany | Nov. 29, 1930 |